US006404614B1

(12) United States Patent
Zhu et al.

(10) Patent No.: US 6,404,614 B1
(45) Date of Patent: Jun. 11, 2002

(54) VOLTAGE TUNED DIELECTRIC VARACTORS WITH BOTTOM ELECTRODES

(75) Inventors: Yongfei Zhu, Columbia; Louise C. Sengupta, Ellicott City, both of MD (US)

(73) Assignee: Paratek Microwave, Inc., Columbia, MD (US)

(*) Notice: Subject to any disclaimer, the term of this patent is extended or adjusted under 35 U.S.C. 154(b) by 0 days.

(21) Appl. No.: 09/844,832

(22) Filed: Apr. 27, 2001

Related U.S. Application Data
(60) Provisional application No. 60/201,349, filed on May 2, 2000.

(51) Int. Cl.[7] .............................. H01G 5/00; H01G 5/06
(52) U.S. Cl. .................... 361/277; 361/281; 361/298.3; 361/298.2
(58) Field of Search ................................. 361/277, 278, 361/281, 282, 290, 292, 298.2, 298.3; 257/595, 602, 295

(56) References Cited

U.S. PATENT DOCUMENTS

| | | |
|---|---|---|
| 5,312,790 A | 5/1994 | Sengupta et al. |
| 5,427,988 A | 6/1995 | Sengupta et al. |
| 5,472,935 A | 12/1995 | Yandrofski et al. |
| 5,486,491 A | 1/1996 | Sengupta et al. |
| 5,635,433 A | 6/1997 | Sengupta |
| 5,635,434 A | 6/1997 | Sengupta |
| 5,640,042 A | 6/1997 | Koscica et al. |
| 5,693,429 A | 12/1997 | Sengupta et al. |
| 5,766,697 A | 6/1998 | Sengupta et al. |
| 5,830,591 A | 11/1998 | Sengupta et al. |
| 5,846,893 A | 12/1998 | Sengupta et al. |
| 6,278,158 B1 * | 8/2001 | Pastor et al. ................ 257/295 |

FOREIGN PATENT DOCUMENTS

| | | |
|---|---|---|
| WO | WO 98/20606 A3 | 5/1998 |
| WO | WO 98/20606 A2 | 5/1998 |
| WO | WO 00/24079 | 4/2000 |
| WO | WO 00/28613 | 5/2000 |
| WO | WO 00/62367 | 10/2000 |

OTHER PUBLICATIONS

U.S. application No. 09/594,837, Chiu, filed Jun. 15, 2000.
U.S. application No. 09/660,309, Zhu et al., filed Sep. 12, 2000.
U.S. application No. 09/768,690, Sengupta et al., filed Jan. 24, 2001.
H.–D. Wu et al., "Voltage Tunable Capacitors Using High Temperature Superconductors and Ferroelectrics," *IEEE Transactions on Applied Superconductivity*, vol. 4, No. 3, Sep. 1994, pp. 156–160.

* cited by examiner

*Primary Examiner*—Anthony Dinkins
(74) *Attorney, Agent, or Firm*—Robert P. Lenart; Pietragallo, Bosick & Gordon

(57) ABSTRACT

A voltage tunable dielectric varactor includes a substrate having a first dielectric constant and having generally a planar surface, first and second electrodes positioned on the generally planar surface of the substrate, the first and second electrodes being separated to form a first gap therebetween; a tunable dielectric layer positioned on the first and second electrodes and in the first gap, the tunable dielectric layer having a second dielectric constant greater than the first dielectric constant; and third and fourth electrodes positioned on a surface of the tunable dielectric layer opposite the first and second electrodes, the third and fourth electrodes being separated to form a second gap therebetween.

12 Claims, 2 Drawing Sheets

VOLTAGE TUNED DIELECTRIC VARACTORS WITH BOTTOM ELECTRODES

CROSS REFERENCE TO RELATED APPLICATION

This application claims the benefit of the filing date of provisional application Ser. No. 60/201,349, filed May 2, 2000.

FIELD OF THE INVENTION

This invention relates to tunable radio frequency devices, and more particularly, to voltage-tuned dielectric varactors.

Varactors are voltage tunable capacitors in which the capacitance can be changed by applying an electric field to the device. This property has wide applications in electrically tuned radio frequency circuits, such as tunable filters, phase shifters, delay lines, voltage controlled oscillators, etc. The most commonly used varactor is a semiconductor diode varactor, which generally has a low quality factor, Q, especially at high frequencies, low power handling capacity, low third intermodulation product (IP3), and a limited capacitance range. Another type of voltage tunable varactor uses ferroelectric materials.

Tunable ferroelectric materials are materials whose permittivity (more commonly called dielectric constant) can be varied by varying the strength of an electric field to which the materials are subjected. Even though these materials work in their paraelectric phase above the Curie temperature, they are conveniently called "ferroelectric" because they exhibit spontaneous polarization at temperatures below the Curie temperature. Tunable ferroelectric materials including barium-strontium titanate (BST) or BST composites have been the subject of several patents.

Dielectric materials including barium strontium titanate are disclosed in U.S. Pat. No. 5,312,790 to Sengupta, et al. entitled "Ceramic Ferroelectric Material"; U.S. Pat. No. 5,427,988 to Sengupta, et al. entitled "Ceramic Ferroelectric Composite Material-BSTO—MgO"; U.S. Pat. No. 5,486,491 to Sengupta, et al. entitled "Ceramic Ferroelectric Composite Material—BSTO—$ZrO_2$"; U.S. Pat. No. 5,635,434 to Sengupta, et al. entitled "Ceramic Ferroelectric Composite Material-BSTO-Magnesium Based Compound"; U.S. Pat. No. 5,830,591 to Sengupta, et al. entitled "Multi-layered Ferroelectric Composite Waveguides"; U.S. Pat. No. 5,846,893 to Sengupta, et al. entitled "Thin Film Ferroelectric Composites and Method of Making"; U.S. Pat. No. 5,766,697 to Sengupta, et al. entitled "Method of Making Thin Film Composites"; U.S. Pat. No. 5,693,429 to Sengupta, et al. entitled "Electronically Graded Multilayer Ferroelectric Composites"; and U.S. Pat. No. 5,635,433 to Sengupta, entitled "Ceramic Ferroelectric Composite Material-BSTO—ZnO". These patents are hereby incorporated by reference. In addition, copending, commonly assigned United States patent applications Ser. No. 09/594,837, filed Jun. 15, 2000, and Ser. No. 09/768,690, filed Jan. 24, 2001, disclose additional tunable dielectric materials and are also incorporated by reference. The materials shown in these patents, especially BSTO—MgO composites, show low dielectric loss and high tunability. Tunability is defined as the fractional change in the dielectric constant with applied voltage.

One tunable dielectric varactor is shown in U.S. Pat. No. 5,640,042. That patent shows a planar ferroelectric varactor, including a carrier substrate layer, a high temperature superconducting metallic layer deposited on the substrate for lattice matching, a thin film ferroelectric deposited on the metallic layer, and metallic conductors for connecting the varactor to radio frequency transmission lines. Other tunable dielectric varactors are shown in PCT patent applications PCT/US99/24161 and PCT/US99/26113, and U.S. patent application Ser. No. 09/660,309, which is hereby incorporated by reference. In some varactor applications, is it desirable to provide a tunable varactor that has a relatively low capacitance.

It would be desirable to have a tunable dielectric varactor that does not require a superconducting layer, and can operate at room temperature, has low dielectric losses and can be constructed to obtain relatively low capacitances (typically<2 pF).

SUMMARY OF THE INVENTION

Voltage tunable dielectric varactors constructed in accordance with this invention include a substrate having a first dielectric constant and having a generally planar surface, first and second electrodes positioned on the generally planar surface of the substrate, the first and second electrodes being separated to form a first gap therebetween; a tunable dielectric layer positioned on the first and second electrodes and in the first gap, the tunable dielectric layer having a second dielectric constant greater than the first dielectric constant; and third and fourth electrodes positioned on a surface of the tunable dielectric layer opposite the first and second electrodes, the third and fourth electrodes being separated to form a second gap therebetween.

DESCRIPTION OF THE PREFERRED EMBODIMENTS

Figure 1:
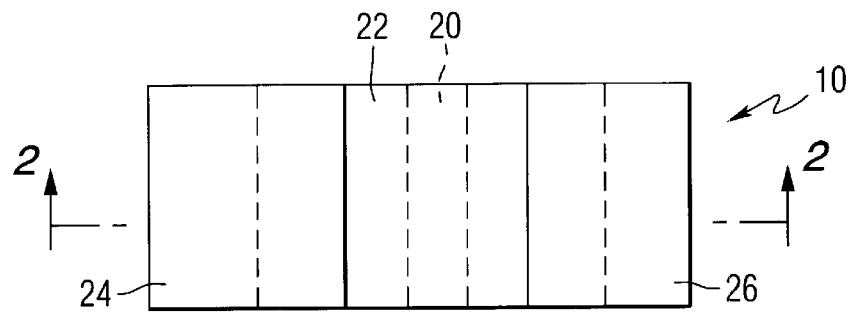
FIG. 1 is a top plan view of a tunable dielectric varactor constructed in accordance with this invention.
Figure 2:
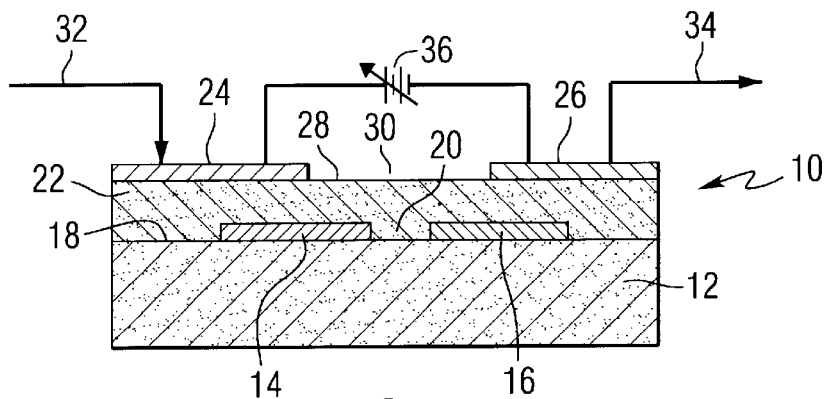
FIG. 2 is a cross-sectional view of the varactor of FIG. 1, taken along line 2—2.

Referring to the drawings, FIG. 1 is a top plan view of a tunable dielectric varactor constructed in accordance with a first embodiment of this invention, and FIG. 2 is a cross-sectional view of the varactor of FIG. 1, taken along line 2—2. The varactor 10 of FIGS. 1 and 2 includes a carrier substrate layer 12, a first bottom electrode 14 and a second bottom electrode 16. The bottom electrodes are positioned on a generally planar surface 18 of the substrate and separated to form a gap 20. A tunable dielectric film 22 covers the bottom electrodes and fills the gap. Top electrodes 24 and 26 are positioned on a top surface 28 of the tunable dielectric layer. The top electrodes are separated by a second gap 30. Input connection 32 and output connection 34 are provided to connect the varactor to an external circuit. A variable DC voltage source 36 is connected to the top electrodes to provide an electric field that is used to control the dielectric constant of the tunable dielectric material.

Figure 3:
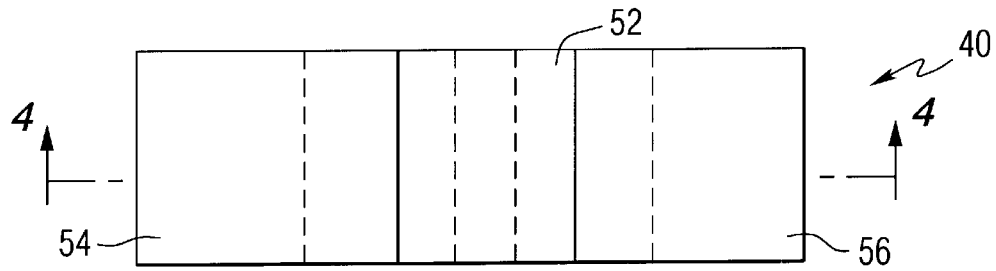
FIG. 3 is a top plan view of another tunable dielectric varactor constructed accordance with this invention.
Figure 4:
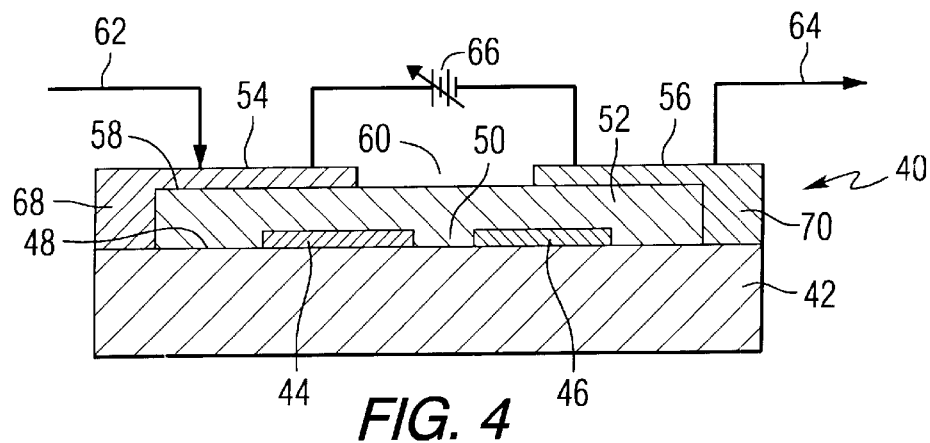
FIG. 4 is a cross-sectional view of the varactor of FIG. 3, taken along line 4—4.

FIG. 3 is a top plan view of a tunable dielectric varactor constructed in accordance with another embodiment of this invention, and FIG. 4 is a cross-sectional view of the varactor of FIG. 3, taken along line 4—4. The varactor 40 of FIGS. 3 and 4 includes a carrier substrate layer 42, a first bottom electrode 44 and a second bottom electrode 46 positioned on a generally planar surface 48 of the substrate. The bottom electrodes are separated to form a gap 50. A tunable dielectric film 52 covers the bottom electrodes and fills the gap. Top electrodes 54 and 56 are positioned on a top surface 58 of the tunable dielectric layer. The top electrodes are separated by a second gap 60. Input connection 62 and output connection 64 are provided to connect the varactor to an external circuit. A variable DC voltage source 66 is connected to the top electrodes to provide an electric field that is used to control the dielectric constant of the tunable dielectric material. The varactor of FIGS. 3 and 4 is similar to that of FIGS. 1 and 2, except that each of the top electrodes include portions 68 and 70, respectively, each extending along a side of the tunable dielectric material.

Figure 5:
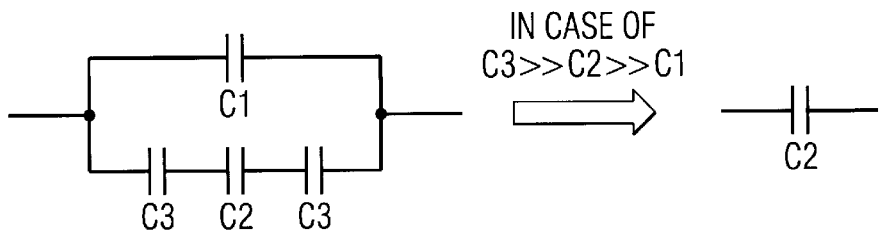
FIGS. 5 and 6 are schematic diagrams of an equivalent circuit of the varactors of this invention.

A simple equivalent circuit of varactors constructed in accordance with this invention is shown in FIG. 5. The equivalent capacitance, C, of the varactor can be expressed as:

$$C=C1+(C2C/2)/(C2+C3/2)$$

Where C1 is the capacitance contributed by the top electrodes and the top gap; C2 is the capacitance contributed by the bottom electrodes and the bottom gap; and C3 is the capacitance contributed by one top electrode and one bottom electrode on one side of the device. If C3>>C2>>C1, then C≈C2. Typically, C<2 pF.

It can be seen that C2>C1 even in case of the top gap being the same width as the bottom gap, because more tunable material (with high dielectric constant) is involved in the bottom electrode gap than in the top electrode gap. In order to achieve C2>>C1, for example C2/C1>20, the top gap should be much bigger than the bottom gap. A typical width of the bottom gap is 1 $\mu$m to 3 $\mu$m, while the width of the top gap is greater than 60 $\mu$m.

It is easy to make C3>>C2, since the thickness of the tunable material is thinner than the width of the bottom gap, more tunable material is involved in C3 than in C2, or in other words, the electrode area in C3 is much bigger than that of C2. A typical thickness of the tunable film is about 0.2 $\mu$m to 1 $\mu$m. The ratio of C3/C2 is typically greater than 50.

Figure 6:
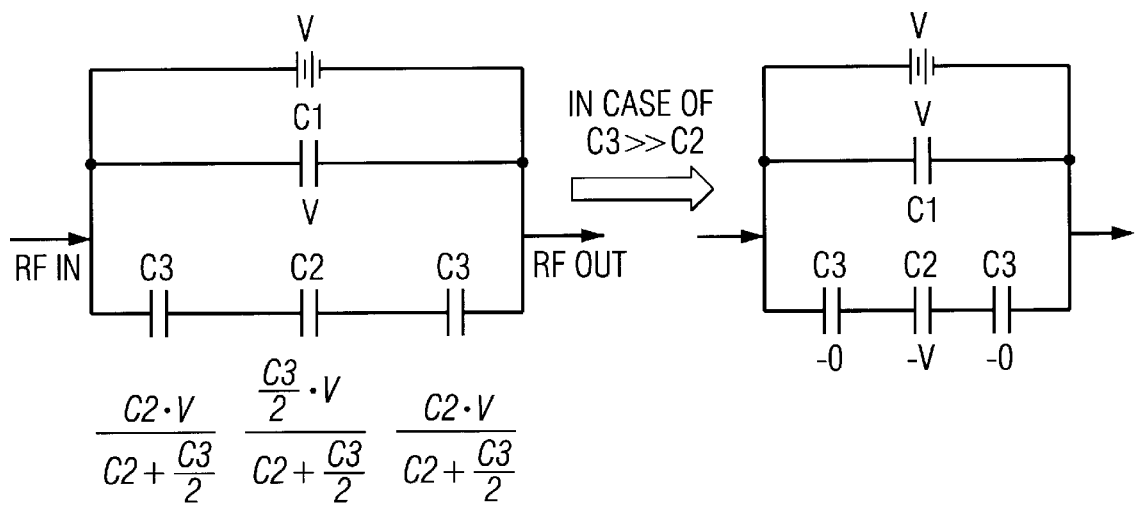
Figure 7:
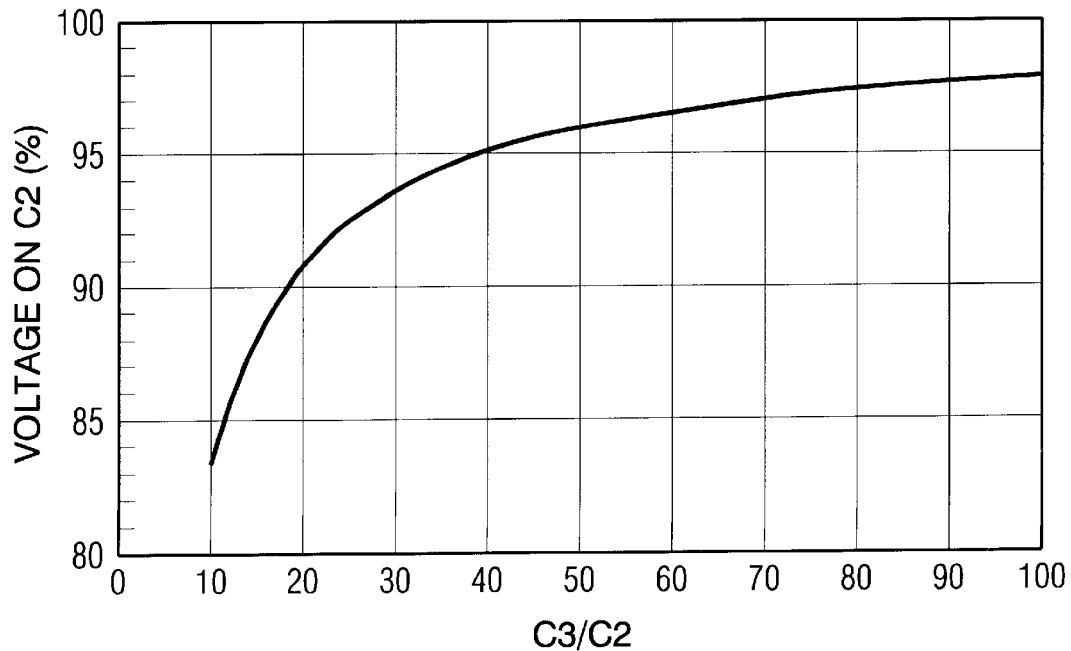
FIG. 7 is a graph showing the voltage on a capacitor in the equivalent circuit of FIG. 6.

FIG. 6 is a schematic circuit showing the DC bias voltage distribution among the various capacitances. It can be seen that more than 95% of the applied voltage drops across C2, when C3/C2 is more than 40.

Tuning of the varactor can be expressed as:

$$(C^o-C^v)/C^o=1-[(2+C3/C2^o)/(2+C3/C2^v)]$$

$$(C^o-C^v)/C^o\approx 1-(C2v/C2^o)$$

$$(C^o-C^v)/C^o=(C2^o-C2^v)/C2^o$$

where $C^o$, $C^v$ are the capacitance of C at 0 volts and a bias voltage, v, respectively, and $C2^o$, $C2^v$ are the capacitance of C2 at 0 volts and a bias voltage, v, respectively.

These equation show that the tuning of the varactor is dominated by tuning of C2. Typical tuning of the varactor is about 20% to 70%.

The varactor is fabricated by the steps of: (a) deposition of the bottom electrodes on a substrate; (b) deposition of the tunable film to cover the bottom electrodes and the whole substrate surface or a strip line; (c) deposition of the top electrodes. Proper etching and/or mask processing is needed to achieve the specific patterns of the bottom and top electrodes, and the pattern of the tunable film in the case where a strip line of tunable film is used.

The substrate may be MgO, alumina ($AL_2O_3$), $LaAlO_3$, sapphire, quartz, silicon, gallium arsenide, or other materials compatible with tunable films and their processing. The bottom electrodes may be platinum, platinum-rhodium, ruthenium oxide or other conducting materials that are compatible with tunable films and their processing. It is important to use a low loss and high tunability film in the varactor. These tunable dielectric materials have dielectric constants ranging from 2 to 1000, and tuning of greater than 5%, with loss tangents of better that 0.02. The thin films or thick films of these materials may be deposited on substrates by technologies of metal-organic solution deposition (MOSD or simply MOD), metal-organic chemical vapor deposition (MOCVD), pulse laser deposition (PLD), sputtering, screen printing, and so on. The top electrodes may be gold, silver, copper, platinum, ruthenium oxide, or other conducting material compatible with tunable films.

In the preferred embodiments, the tunable dielectric material can be deposited on the entire surface of the substrate, or only in the center area on the bottom electrodes and in the bottom gap, to reduce the dielectric loss of the varactor.

This invention provides tunable dielectric varactors that operate at room temperature, and in which the capacitance is tuned by varying the dielectric constant through the application of a bias voltage.

The tunable dielectric material can comprise at least one electronically tunable dielectric phase, such as barium strontium titanate, in combination with other compounds. Barium strontium titanate of the formula $Ba_xSr_{1-x}TiO_3$ is a preferred electronically tunable dielectric material due to its favorable tuning characteristics, low Curie temperatures and low microwave loss properties. In the formula $Ba_xSr_{1-x}TiO_3$, x can be any value from 0 to 1, preferably from about 0.15 to about 0.6. More preferably, x is from 0.3 to 0.6.

Other electronically tunable dielectric materials may be used partially or entirely in place of barium strontium titanate. An example is $Ba_xCa_{1-x}TiO_3$, where x can vary from about 0.2 to about 0.8, preferably from about 0.4 to about 0.6. Additional electronically tunable ferroelectrics include $Pb_xZr_{1-x}TiO_3$ (PZT) where x ranges from about 0.05 to about 0.4, lead lanthanum zirconium titanate (PLZT), lead titanate ($PbTiO_3$), barium calcium zirconium titanate ($BaCaZrTiO_3$), sodium nitrate ($NaNO_3$), $KNbO_3$, $LiNbO_3$, $LiTaO_3$, $PbNb_2O_6$, $PbTa_2O_6$, $KSr(NbO_3)$ and $NaBa_2(NbO_3)5$ $KH_2PO_4$.

The varactor can also include electronically tunable materials having at least one metal silicate phase. The metal silicates may include metals from Group 2A of the Periodic Table, i.e., Be, Mg, Ca, Sr, Ba and Ra, preferably Mg, Ca, Sr and Ba. Preferred metal silicates include $Mg_2SiO_4$, $CaSiO_3$, $BaSiO_3$ and $SrSiO_3$. In addition to Group 2A metals, the present metal silicates may include metals from Group 1A, i.e., Li, Na, K, Rb, Cs and Fr, preferably Li, Na and K. For example, such metal silicates may include sodium silicates such as $Na_2SiO_3$ and $NaSiO_3$-$5H_2O$, and lithium-containing silicates such as $LiAlSiO_4$, $Li_2SiO_3$ and $Li_4SiO_4$. Metals from Groups 3A, 4A and some transition metals of the Periodic Table may also be suitable constituents of the metal silicate phase. Additional metal silicates may include $Al_2Si_2O_7$, $ZrSiO_4$, $KAlSi_3O_8$, $NaAlSi_3O_8$, $CaAl_2Si_2O_8$, $CaMgSi_2O_6$, $BaTiSi_3O_9$ and $Zn_2SiO_4$. Tunable dielectriec materials identified as Parascan™ materials, are available from Paratek Microwave, Inc. The above tunable materials can be tuned at room temperature by controlling an electric field that is applied across the materials.

In addition to the electronically tunable dielectric phase, the electronically tunable materials can include at least two additional metal oxide phases. The additional metal oxides may include metals from Group 2A of the Periodic Table, i.e., Mg, Ca, Sr, Ba, Be and Ra, preferably Mg, Ca, Sr and Ba. The additional metal oxides may also include metals from Group 1A, i.e., Li, Na, K, Rb, Cs and Fr, preferably Li, Na and K. Metals from other Groups of the Periodic Table may also be suitable constituents of the metal oxide phases. For example, refractory metals such as Ti, V, Cr, Mn, Zr, Nb, Mo, Hf, Ta and W may be used. Furthermore, metals such as Al, Si, Sn, Pb and Bi may be used. In addition, the metal oxide phases may comprise rare earth metals such as Sc, Y, La, Ce, Pr, Nd and the like.

The additional metal oxides may include, for example, zirconnates, silicates, titanates, aluminates, stannates, niobates, tantalates and rare earth oxides. Preferred additional metal oxides include $Mg_2SiO_4$, MgO, $CaTiO_3$, $MgZrSrTiO_6$, $MgTiO_3$, $MgAl_2O_4$, $WO_3$, $SnTiO_4$, $ZrTiO_4$, $CaSiO_3$, $CaSnO_3$, $CaWO_4$, $CaZrO_3$, $MgTa_2O_6$, $MgZrO_3$, $MnO_2$, PbO, $Bi_2O_3$ and $La_2O_3$. Particularly preferred additional metal oxides include $Mg_2SiO_4$, MgO, $CaTiO_3$, $MgZrSrTiO_6$, $MgTiO_3$, $MgAl_2O_4$, $MgTa_2O_6$ and $MgZrO_3$.

The additional metal oxide phases are typically present in total amounts of from about 1 to about 80 weight percent of the material, preferably from about 3 to about 65 weight percent, and more preferably from about 5 to about 60 weight percent. In a particularly preferred embodiment, the additional metal oxides comprise from about 10 to about 50 total weight percent of the material. The individual amount of each additional metal oxide may be adjusted to provide the desired properties. Where two additional metal oxides are used, their weight ratios may vary, for example, from about 1:100 to about 100:1, typically from about 1:10 to about 10:1 or from about 1:5 to about 5:1. Although metal oxides in total amounts of from 1 to 80 weight percent are typically used, smaller additive amounts of from 0.01 to 1 weight percent may be used for some applications.

In one embodiment, the additional metal oxide phases may include at least two Mg-containing compounds. In addition to the multiple Mg-containing compounds, the material may optionally include Mg-free compounds, for example, oxides of metals selected from Si, Ca, Zr, Ti, Al and/or rare earths. In another embodiment, the additional metal oxide phases may include a single Mg-containing compound and at least one Mg-free compound, for example, oxides of metals selected from Si, Ca, Zr, Ti, Al and/or rare earths.

The tunability may be defined as the dielectric constant of the material with an applied voltage divided by the dielectric constant of the material with no applied voltage. Thus, the voltage tunability percentage may be defined by the formula:

$$T=((X-Y)/X) \cdot 100;$$

where X is the dielectric constant with no voltage and Y is the dielectric constant with a specific applied voltage. High tunability is desirable for many applications. Voltage tunable dielectric materials preferably exhibit a tunability of at least about 20 percent at 8V/micron, or more preferably at least about 25 percent at 8V/micron. For example, the voltage tunable dielectric material may exhibit a tunability of from about 30 percent to about 75 percent or higher at 8V/micron.

The combination of tunable dielectric materials such as BSTO with additional metal oxides allows the materials to have high tunability, low insertion losses and tailorable dielectric properties, such that they can be used in microwave frequency applications. The materials demonstrate improved properties such as increased tuning, reduced loss tangents, reasonable dielectric constants for many microwave applications, stable voltage fatigue properties, higher breakdown levels than previous state of the art materials, and improved sintering characteristics. A particular advantage of the above materials is that tuning is dramatically increased compared with conventional low loss tunable dielectrics. The tunability and stability achieved with the present materials enables new RF applications not previously possible. A further advantage is that the materials may be used at room temperature. The electronically tunable materials may be provided in several manufacturable forms such as bulk ceramics, thick film dielectrics and thin film dielectrics.

This invention provides tunable dielectric varactors having high Q, high tuning ability, high IP3 values, wide capacitance ranges, high power handling capacity, and low cost. These varactors are suitable for use in tunable device applications such as tunable filters, phase shifters, voltage controlled oscillators, etc., in the VHF, UHF, microwave and millimeter wave frequency ranges.

While the present invention has been described in terms of what are at present believed to be its preferred embodiments, it will be apparent to those skilled in the art that various changes may be made to the preferred embodiments without departing from the scope of the invention as defined by the following claims.

What is claimed is:

1. A voltage tunable dielectric varactor comprising:
   a substrate having a first dielectric constant and having a generally planar surface;
   first and second electrodes positioned on the generally planar surface of the substrate said first and second electrodes being separated to form a first gap therebetween;
   a tunable dielectric layer positioned on the first and second electrodes and in said first gap, the tunable dielectric layer having a second dielectric constant greater than said first dielectric constant; and
   third and fourth electrodes positioned on a surface of the tunable dielectric layer opposite the first and second electrodes, said third and fourth electrodes being separated to form a second gap therebetween.

2. A voltage tunable dielectric varactor as recited in claim 1, wherein:
   said first gap is narrower than said second gap.

3. A voltage tunable dielectric varactor as recited in claim 1, wherein the tunable dielectric layer has a dielectric constant ranging from 2 to 1000, tuning of greater than 5%, and a loss tangent of less than 0.02.

4. A voltage tunable dielectric varactor as recited in claim 1, wherein the substrate has a permittivity of less than about 30.

5. A voltage tunable dielectric varactor as recited in claim 1, wherein first, second, third and fourth electrodes each comprise one of the group of:
   gold, silver, copper, platinum, platinum-rhodium, and ruthenium oxide.

6. A voltage tunable dielectric varactor as recited in claim 1, wherein the substrate comprises one of the group of: MgO, Alumina, $LaAlO_3$, sapphire, quartz, silicon, and gallium arsenide.

7. A voltage tunable dielectric varactor as recited in claim 1, wherein the tunable dielectric layer comprises one of:
   a tunable ferroelectric thick film;
   a tunable ferroelectric bulk ceramic; and
   a tunable ferroelectric thin film.

8. A voltage tunable dielectric varactor as recited in claim 1, further including:
an RF input and an RF output for passing an RF signal through the tunable dielectric layer in a first direction, and wherein the first and second gaps lie parallel to a second direction substantially perpendicular to the first direction.

9. A voltage tunable dielectric varactor as recited in claim 1, wherein the tunable dielectric layer comprises a material selected from the group of:
barium strontium titanate, barium calcium titanate, lead zirconium titanate, lead lanthanum zirconium titanate, lead titanate, barium calcium zirconium titanate, sodium nitrate, $KNbO_3$, $LiNbO_3$, $LiTaO_3$, $PbNb_2O_6$, $PbTa_2O_6$, $KSr(NbO_3)$, $NaBa_2(NbO_3)_5$, $KH_2PO_4$, and combinations thereof.

10. A voltage tunable dielectric varactor as recited in claim 1, wherein the tunable dielectric layer comprises a barium strontium titanate (BSTO) composite selected from the group of:
BSTO—MgO, BSTO—$MgAl_2O_4$, BSTO—$CaTiO_3$, BSTO—$MgTiO_3$, BSTO—$MgSrZrTiO_6$, and combinations thereof.

11. A voltage tunable dielectric varactor as recited in claim 1, wherein the tunable dielectric layer comprises a material selected from the group of:
$Mg_2SiO_4$, $CaSiO_3$, $BaSiO_3$, $SrSiO_3$, $Na_2SiO_3$, $NaSiO_3$—$5H_2O$, $LiAlSiO_4$, $Li_2SiO_3$, $Li_4SiO_4$, $Al_2Si_2O_7$, $ZrSiO_4$, $KAlSi_3O_8$, $NaAlSi_3O_8$, $CaAl_2Si_2O_8$, $CaMgSi_2O_6$, $BaTiSi_3O_9$ and $Zn_2SiO_4$.

12. A voltage tunable dielectric varactor as recited in claim 1, wherein the tunable dielectric layer comprises:
an electronically tunable phase and at least two metal oxide phases.

* * * * *

UNITED STATES PATENT AND TRADEMARK OFFICE
CERTIFICATE OF CORRECTION

PATENT NO. : 6,404,614 B1
DATED : June 11, 2002
INVENTOR(S) : Zhu et al.

It is certified that error appears in the above-identified patent and that said Letters Patent is hereby corrected as shown below:

Column 4,
Line 62, replace "dielectriec" with -- dielectric --.

Signed and Sealed this

Fourth Day of February, 2003

JAMES E. ROGAN
*Director of the United States Patent and Trademark Office*